United States Patent
Lindoff et al.

(10) Patent No.: US 9,713,151 B2
(45) Date of Patent: Jul. 18, 2017

(54) COMMUNICATION SYSTEM, NETWORK NODE, COMMUNICATION DEVICE, METHODS AND COMPUTER PROGRAMS FOR CARRIER AGGREGATION AND DEVICE-TO-DEVICE COMMUNICATION IN A COMMUNICATION NETWORK

(71) Applicant: Telefonaktiebolaget L M Ericsson (publ), Stockholm (SE)

(72) Inventors: Bengt Lindoff, Bjärred (SE); Stefano Sorrentino, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 14/648,732

(22) PCT Filed: May 11, 2015

(86) PCT No.: PCT/EP2015/060358
§ 371 (c)(1),
(2) Date: Jun. 1, 2015

(87) PCT Pub. No.: WO2015/173187
PCT Pub. Date: Nov. 19, 2015

(65) Prior Publication Data
US 2016/0262155 A1    Sep. 8, 2016

Related U.S. Application Data

(60) Provisional application No. 61/994,269, filed on May 16, 2014.

(51) Int. Cl.
*H04W 72/04* (2009.01)
*H04W 76/02* (2009.01)
(Continued)

(52) U.S. Cl.
CPC ....... *H04W 72/0453* (2013.01); *H04W 8/005* (2013.01); *H04W 28/0215* (2013.01);
(Continued)

(58) Field of Classification Search
CPC ............. H04W 76/023; H04W 76/043; H04W 72/048; H04W 8/005;
(Continued)

(56) References Cited

U.S. PATENT DOCUMENTS

2014/0153390 A1    6/2014 Ishii et al.
2015/0146633 A1*   5/2015 Kalhan ................. H04L 1/1607
                                                           370/329
(Continued)

FOREIGN PATENT DOCUMENTS

WO    2013068788 A1    5/2013
WO    2013120267 A1    8/2013
(Continued)

OTHER PUBLICATIONS

Shajaiah, H., et al.—"Spectrum Sharing between Public Safety and Commercial Users in 4G-LTE". Computing, Networking and Communications (ICNC), 2014 International Conference on Feb. 6, 2014, Honolulu, HI, pp. 674-679, IEEE, INSPEC Accession No. 14221952, DOI: 10.1109/ICCNC.2014.6785417 consisting of 6-pages.

*Primary Examiner* — Marcus R Smith
(74) *Attorney, Agent, or Firm* — Christopher & Weisberg, P.A.

(57) ABSTRACT

The disclosure relates to aspects of a communication system comprising a cellular communication network and at least a communication device interacting with the cellular communication network. The cellular communication network comprises at least a network node configured to receive, from the communication device, signalling about carrier
(Continued)

aggregation communication capabilities suitable for D2D and carrier aggregation communication of the communication device; determine a configuration for the communication device regarding D2D communication and carrier aggregation based on at least the received signalling; and transmit the configuration to the communication device. The communication device is capable of D2D communication within a cellular communication system framework and capable of carrier aggregation for cellular communication, and is configured to determine carrier aggregation communication capabilities suitable for D2D communication and carrier aggregation; and signal the carrier aggregation communication capabilities to the network node.

21 Claims, 3 Drawing Sheets

(51) Int. Cl.
    *H04W 8/00*     (2009.01)
    *H04W 28/02*     (2009.01)
    *H04L 5/00*     (2006.01)
(52) U.S. Cl.
    CPC ....... *H04W 72/048* (2013.01); *H04W 76/023* (2013.01); *H04L 5/001* (2013.01)

(58) Field of Classification Search
    CPC ..... H04W 4/005–4/006; H04W 5/001; H04W 5/0098
    See application file for complete search history.

(56) References Cited

U.S. PATENT DOCUMENTS

| | | | |
|---|---|---|---|
| 2015/0257160 A1* | 9/2015 | Ishida | H04W 72/0486 455/452.1 |
| 2015/0327240 A1* | 11/2015 | Yamada | H04W 72/048 455/426.1 |
| 2015/0341878 A1* | 11/2015 | Lee | H04W 56/004 370/329 |
| 2015/0365945 A1* | 12/2015 | Morioka | H04L 5/0064 370/329 |
| 2016/0037322 A1* | 2/2016 | Nguyen | H04W 8/005 370/329 |
| 2016/0192424 A1* | 6/2016 | Suzuki | H04W 8/005 370/328 |

FOREIGN PATENT DOCUMENTS

| | | |
|---|---|---|
| WO | 2013182115 A1 | 12/2013 |
| WO | 2013185798 A1 | 12/2013 |

\* cited by examiner

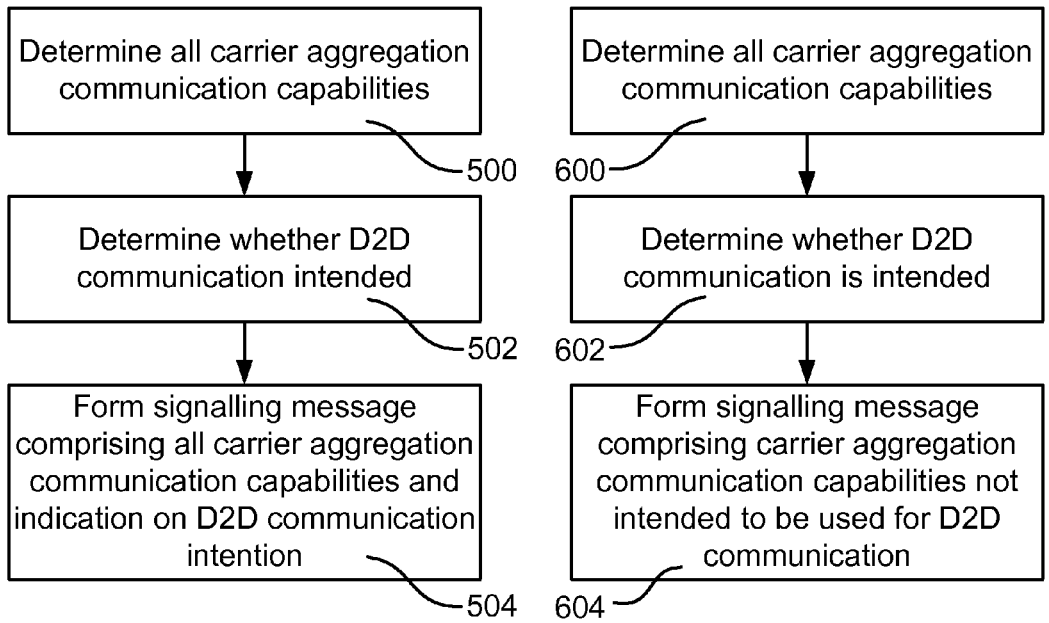
Fig. 5
Fig. 6
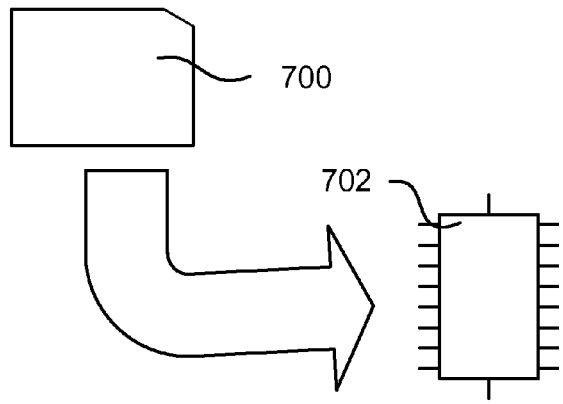
Fig. 7

COMMUNICATION SYSTEM, NETWORK NODE, COMMUNICATION DEVICE, METHODS AND COMPUTER PROGRAMS FOR CARRIER AGGREGATION AND DEVICE-TO-DEVICE COMMUNICATION IN A COMMUNICATION NETWORK

TECHNICAL FIELD

The present invention generally relates to carrier aggregation and device-to-device communication in cellular communication networks.

BACKGROUND

Device-to-device communication is a well-known and widely used component of many existing wireless technologies, including ad hoc and cellular networks. Examples include Bluetooth and several variants of the IEEE 802.11 standards suite such as WiFi Direct. These systems operate in unlicensed spectrum Recently, device-to-device (D2D) communications as an underlay to cellular networks (mainly LTE) have been proposed as a means to take advantage of the proximity of communicating devices and at the same time to allow devices to operate in a controlled interference environment. Typically, it is suggested that such device-to-device communication shares the same spectrum as the cellular system, for example by reserving some of the cellular uplink resources for device-to-device purposes. In this disclosure, such D2D communication is referred to as D2D communication within a cellular communication system framework. Allocating dedicated spectrum for device-to-device purposes is a less likely alternative as spectrum is a scarce resource and (dynamic) sharing between the D2D services and cellular services is more flexible and provides higher spectrum efficiency.

SUMMARY

The inventors have realized beneficial ways to provide some dynamic sharing between D2D services and cellular services. Embodiments of the invention are based on the understanding that carrier aggregation communication capabilities may be utilized both for cellular communication employing carrier aggregation and for inter-frequency D2D communication, and that active and/or dynamic sharing of the capabilities between these services may be beneficial, especially for certain communication scenarios.

According to a first aspect, there is provided a communication system comprising a cellular communication network and at least a communication device interacting with the cellular communication network. The cellular communication network comprises at least a network node configured to receive, from the communication device, signalling about carrier aggregation communication capabilities suitable for D2D and carrier aggregation communication of the communication device; determine a configuration for the communication device regarding D2D communication and carrier aggregation based on at least the received signalling; and transmit the configuration to the communication device. The communication device is capable of device-to-device, D2D, communication within a cellular communication system framework and capable of carrier aggregation for cellular communication, and is configured to determine carrier aggregation communication capabilities suitable for D2D communication and carrier aggregation; and signal the carrier aggregation communication capabilities to the network node.

According to a second aspect, there is provided a communication device capable of device-to-device, D2D, communication within a cellular communication system framework and capable of carrier aggregation for cellular communication. The communication device is configured to determine carrier aggregation communication capabilities suitable for D2D communication and carrier aggregation; and signal the determined carrier aggregation communication capabilities to a network node of the cellular communication system.

The communication device may be configured to determine the carrier aggregation communication capabilities by determining all the carrier aggregation communication capabilities and determining whether D2D communication is intended. The signalled carrier aggregation communication capabilities may comprise information about all carrier aggregation communication capabilities and the intention to allocate some of the carrier aggregation communication capabilities for D2D communication on some carrier or carriers. The information about the intention to allocate some of the carrier aggregation communication capabilities for D2D communication may comprise an indication that the communication device intends to perform D2D operation for NSPS (National Security Public Safety) applications. The information about the intention to allocate some of the carrier aggregation communication capabilities for D2D communication may comprise an indication that the communication device intends to perform D2D operation for commercial applications. The information about the intention to allocate some of the carrier aggregation communication capabilities for D2D communication may comprise one or more of: public land mobile network identity for D2D communication; type of application; frequency; and priority index. The intention to allocate some of the carrier aggregation communication capabilities for D2D communication may be based on at least one of a communication scenario and a coverage state of the communication device. The intention to allocate some of the carrier aggregation communication capabilities for D2D communication may be based on whether the communication device is camping on or served by a visitor public land mobile network or a home public land mobile network.

The communication device may be configured to receive signalling from the network node, which network node knows carrier aggregation communication capabilities from the signalling of the communication device's carrier aggregation communication capabilities, about a configuration for allocating the carrier aggregation communication capabilities.

The communication device may be configured to determine the carrier aggregation communication capabilities by determining all capabilities and determining whether D2D communication is intended, wherein the signalled carrier aggregation communication capabilities comprises information about carrier aggregation communication capabilities excluding carrier aggregation communication capabilities intended to be allocated for D2D communication. The excluding of carrier aggregation communication capabilities in the information about carrier aggregation communication capabilities may be based on at least one of signal propagation environment, a communication scenario and a coverage state of the communication device. The excluding of carrier aggregation communication capabilities in the information about carrier aggregation communication capabilities may be based on whether the communication device is camping on or served by a visitor public land mobile network or a home public land mobile network.

According to a third aspect, there is provided a network node of a cellular communication network. If the network node is capable of supporting device-to-device, D2D, communication within a cellular communication system framework and capable of supporting carrier aggregation for cellular communication, the network node is configured to: receive, from a communication device operating in the cellular communication network, signalling about carrier aggregation communication capabilities suitable for D2D communication and carrier aggregation of the communication device; determine a configuration for the communication device regarding D2D communication and carrier aggregation based on at least the received signalling; and transmit information about the configuration to the communication device. If the network node is not capable of supporting device-to-device, D2D, communication within a cellular communication system framework, the network node is configured to transmit information to the communication device about other public land mobile networks and/or other carriers that are suitable for D2D communication.

The information may comprise carriers to be included in carrier aggregation and/or carrier or carriers to be included in D2D communication.

According to a fourth aspect, there is provided a method of a communication system comprising a cellular communication network and at least a communication device interacting with the cellular communication network, wherein the cellular communication network comprises at least a network node and the communication device is capable of device-to-device, D2D, communication within a cellular communication system framework and capable of carrier aggregation for cellular communication. The method comprises: receiving, from the communication device, signalling about carrier aggregation communication capabilities suitable for D2D communication and carrier aggregation of the communication device; determining a configuration for the communication device regarding D2D communication and carrier aggregation based on at least the received signalling; and transmitting the configuration to the communication device, by the network node. The method comprises: determining carrier aggregation communication capabilities suitable for D2D communication and carrier aggregation; and signalling the carrier aggregation communication capabilities to the network node, by the communication device.

According to a fifth aspect, there is provided a method of a communication device capable of device-to-device, D2D, communication within a cellular communication system framework and capable of carrier aggregation for cellular communication. The method comprises determining carrier aggregation communication capabilities suitable for D2D communication and carrier aggregation; and signalling the carrier aggregation communication capabilities to a network node of the cellular communication system.

The method may comprise determining the carrier aggregation communication capabilities by determining all the carrier aggregation communication capabilities; and determining whether D2D communication is intended. The signalled carrier aggregation communication capabilities may comprise information about all the carrier aggregation communication capabilities and the intention to allocate some of the carrier aggregation communication capabilities for D2D communication on some carrier or carriers. The information about the intention to allocate some of the carrier aggregation communication capabilities for D2D communication may comprise an indication that the communication device intends to perform D2D operation for NSPS (National Security Public Safety) applications. The information about the intention to allocate some of the carrier aggregation communication capabilities for D2D communication may comprise an indication that the communication device intends to perform D2D operation for commercial applications. The information about the intention to allocate some of the carrier aggregation communication capabilities for D2D communication may comprise one or more of: public land mobile network identity for D2D communication; type of application; frequency; and priority index. The intention to allocate some of the carrier aggregation communication capabilities for D2D communication may be based on at least one of a communication scenario and a coverage state of the communication device. The intention to allocate some of the carrier aggregation communication capabilities for D2D communication may be based on whether the communication device is camping on or served by a visitor public land mobile network or a home public land mobile network.

The method may comprise receiving signalling from the network node, which network node knows carrier aggregation communication capabilities from the signalling of the communication device's carrier aggregation communication capabilities, about a configuration for allocating the carrier aggregation communication capabilities.

The determining of the carrier aggregation communication capabilities may comprise determining all the carrier aggregation communication capabilities; and determining whether D2D communication is intended. The signalled carrier aggregation communication capabilities may comprise information about carrier aggregation communication capabilities excluding carrier aggregation communication capabilities intended to be allocated for D2D communication. The excluding of carrier aggregation communication capabilities in the information about carrier aggregation communication capabilities may be based on at least one of signal propagation environment, a communication scenario and a coverage state of the communication device. The excluding of carrier aggregation communication capabilities in the information about carrier aggregation communication capabilities may be based on whether the communication device is camping on or served by a visitor public land mobile network or a home public land mobile network.

According to a sixth aspect, there is provided a method of a network node of a cellular communication network. If the network node is capable of supporting device-to-device, D2D, communication within a cellular communication system framework and capable of supporting carrier aggregation for cellular communication, the method comprises: receiving, from a communication device operating in the cellular communication network, signalling about carrier aggregation communication capabilities for D2D communication and carrier aggregation of the communication device; determining a configuration for the communication device regarding D2D communication and carrier aggregation based on at least the received signalling; and transmitting information about the configuration to the communication device. If the network node is not capable of supporting device-to-device, D2D, communication within a cellular communication system framework, the method comprises transmitting information to the communication device about other public land mobile networks and/or other carriers that are suitable for D2D communication.

The information may comprise carriers to be included in carrier aggregation and/or carrier or carriers to be included in D2D communication.

According to a seventh aspect, there is provided a computer program comprising instructions which, when executed on a processor of a communication device, causes the communication device to perform the method according to the fifth aspect.

According to an eighth aspect, there is provided a computer program comprising instructions which, when executed on a processor of a network node, causes the network node to perform the method according to the sixth aspect.

BRIEF DESCRIPTION OF THE DRAWINGS

The above, as well as additional objects, features and advantages of embodiments of the present invention, will be better understood through the following illustrative and non-limiting detailed description of preferred embodiments of the present invention, with reference to the appended drawings.

FIG. 5 is a flow chart schematically illustrating an approach for determining and signalling carrier aggregation communication capabilities.

FIG. 6 is a flow chart schematically illustrating another approach for determining and signalling carrier aggregation communication capabilities.

FIG. 7 schematically illustrates a computer-readable medium and a processing device.

DETAILED DESCRIPTION

Figure 1:
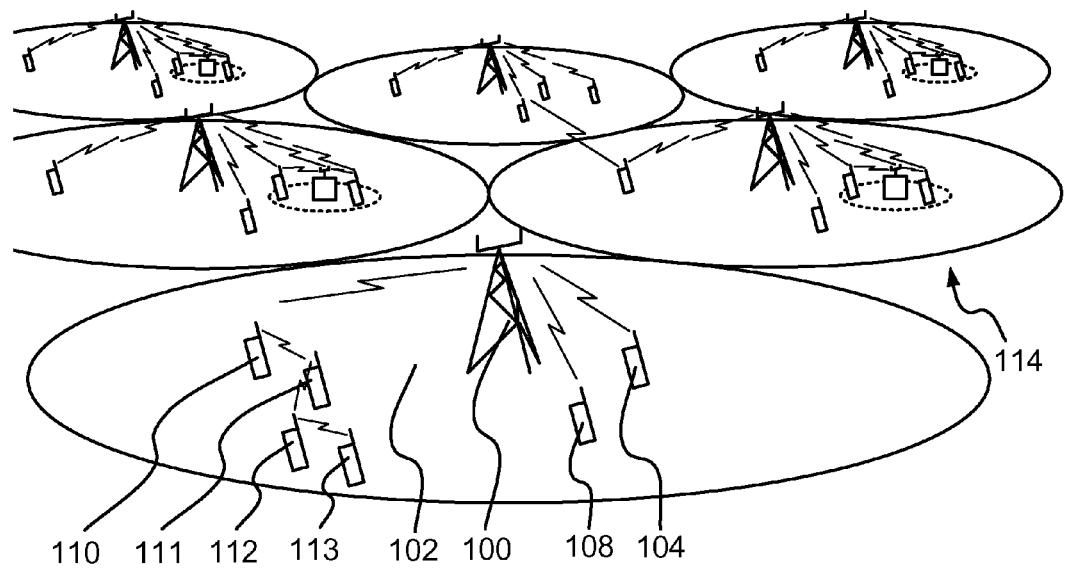
FIG. 1 schematically illustrates a communication system according to an embodiment.

D2D applications include direct discovery and direct communication. In both cases, the transmitter sends D2D signals that should be directly received at least by the intended receivers. One application for D2D communication within a cellular communication system framework is for National Security Public Safety (NSPS) services. For such system it is of outmost importance to be able to communicate D2D in case the cellular network is broken. Thus, the term D2D communication within a cellular communication system framework implies that the cellular network need not be operating, but the regulations and specifications associated with the cellular network and the cellular communication system apply. Hence the term also include the case of direct D2D communication between two devices/user equipments (UEs) in a cellular radio spectrum with no involvement of network node control (for instance in out-of network node coverage scenarios).

D2D should also be able to operate in multi-carrier scenarios where cellular and/or D2D is configured to operate on multiple carriers. Such carriers do not necessarily belong to a single Operator and are not necessarily coordinated and synchronized.

Additional scenarios include roaming where one communication device, user equipment (UE) with 3GPP terminology, camps on a certain public land mobile network (PLMN), i.e. VisitorPLMN, (VPLMN), that has a roaming agreement with the PLMN associated to the subscriber identification module (SIM) in the UE, i.e. Home PLMN (HPLMN). One typical example would be NSPS devices, where the HPLMN (assumed to support D2D communication) typically does not have full geographical network coverage and hence NSPS devices roams into another operator (maybe without D2D functionality) for cellular coverage. However, the NSPS device may be be able to camp on VPLMN and at the same time be able to operate D2D on the HPLMN spectrum. Carrier Aggregation (CA) capable devices should be able to support such scenarios, for example by allocating one transceiver chain on respective carrier.

CA is a way, standardized from 3GPP Release 10 in LTE, to combine several carriers in the communication between the eNodeB/network node and the UE/communication device, and thereby increase the total transmit or receive bandwidth and hence increase the maximal possible throughput for certain service, typically best effort service. The general principle is that the link has one primary cell handling the general control communication and Radio Resource Management (RRM)/mobility, and one or several secondary cells on other carriers that can be configured and activated/de-activated depending on the need for higher throughput. Aggregation of carriers can be made by contiguous carriers and/or non-contiguous carriers (specified in 3GPP Release 11 in LTE).

Communication devices, UEs, that support operation on multiple carriers, i.e. CA communication capability, are configured by the serving network node, eNB or eNodeB with 3GPP terminology for LTE, with respect to their CA configuration. In roaming scenarios where a UE is configured by a certain eNB, it is likely that all CA UE capabilities will be configured for maximizing the performance on the spectrum of the eNB. However, this prevents the UE from performing D2D on additional carriers, possibly not controlled by the serving eNB. In the NSPS case described above, the device may thus then not be able to do D2D on HPLMN since the VPLMN have configured max CA operation, "occupying" all available transceiver chains for cellular communication. This is combatted by some of the embodiments demonstrated below.

Let us consider the case of a D2D-capable and CA-capable UE. According to legacy procedures, the UE signals its CA communication capabilities, e.g., number of supported carriers and bands in uplink (UL) and downlink (DL) to the serving eNB. Similarly, the UE may indicate whether it is able to perform D2D discovery and/or communication, or specific functionalities within the D2D related features.

Typically, the eNB would configure CA in the UE in order to maximize performance in its own cell. This results likely in all the UE transmitter and receiver chains being configured by the eNB on its spectrum.

In some scenarios, a D2D-capable UE would like to perform D2D communication (reception and/or transmission) on one or more carriers that are not managed by the serving eNB. Performing inter-carrier D2D requires typically additional hardware and software capabilities in the UE, e.g., additional transceiver chains. However, if such capabilities are already used by the serving eNB for CA purposes, inter-frequency D2D is not possible or its performance is degraded.

A first set of embodiments includes signalling of inter-frequency D2D-related information from the UE to the eNB. Several options for such signalling are possible and may be combined in any ways. For example, the signalling may comprise the indication that the UE is an NSPS UE. The signalling may comprise the indication that the UE is interested in performing D2D for NSPS-applications or commercial applications on other carriers. The signalling may indicate that the UE intends to perform D2D transmission and/or reception (or other D2D operation) on other carrier(s). Information about the PLMNs, such as identity, type of application, frequency, priority index, etc., that the UE wishes to perform D2D on can be provided.

The content of the "inter-frequency D2D-related information" carried above may be a function of the scenario and the coverage state of the UE. For example, a UE may report different information depending whether it is camping on a VPLMN or HPLMN.

The serving eNB receives the signalling and may configure the UE, e.g., CA configuration for cellular and/or D2D, number of configured HARQ processes, throughput requirements, MIMO configuration and capabilities, D2D configuration, etc., on its own spectrum taking into account the D2D-related information signalled above. For example, the eNB may enable inter-frequency D2D by avoiding allocating all UE CA capabilities to the serving cell, or simply by ensuring that the UE has sufficiently free hardware and software capabilities to perform inter-frequency D2D. The eNB may prioritize between using UE capabilities for the own spectrum and relieving them for inter-frequency D2D purpose based on rules or priorities, e.g. allocate transceiver chain to inter-frequency D2D if it is NSPS or other high priority D2D services.

In some embodiments the VPLMN eNB only configure inter-frequency D2D if NSPS UE requests that, i.e. there may be some mechanism in the NSPS device where one manually chose a "D2D alert status". Instead of manual user setting, there may be an automatic enablement of such alert status, where the automatic enablement may be based for example on geographical position (known from Geolocation sensors, GPS, etc., or Network node assisted positioning), or proximity detection using short range radios, BT, WLAN, RFID (device close to a short range transmitter installed in a police car/ambulance/fire truck etc. indicating "alert status"). In another embodiment, the eNB in case of receiving such alert message/indication can de-configure CA capability and hence reconfigure the device/UE for D2D on HPLMN carrier(s).

In a further embodiment, the set of capabilities reported by a UE to the serving cell is a function of the propagation environment and around the UE. For example, based on whether the suitable PLMN to camp on is HPLMN or VPLMN, the UE signals different capabilities with regard to D2D and/or CA. For example, when a UE camps on certain VPLMN(s), the UE reports a subset of all the available CA capabilities, in order to be able to perform inter-frequency D2D autonomously. In some example, when a UE camps on the HPLMN, it reports all the available CA capabilities, since inter-frequency D2D is less critical. The above example is particularly (but not exclusively) suitable for the NSPS case where the HPLMN is a NSPS operator.

In order to perform the above operations, the UE may need to scan the radio environment prior to signalling its capabilities, at least for the case where the UE camps on a VPLMN.

In a further embodiment, the eNB signals to the UE information about other PLMN(s) and/or other carrier(s) that are suitable for D2D, including indications about their priority and/or the D2D applications run on such carriers, e.g., public safety or commercial D2D carriers). The eNB may even signal radio-related information such as the resources for D2D and/or the carrier frequency.

Signalling of carriers for CA and/or for D2D communication may be made on Radio Resource Control (RRC) messages, but may also be made by activation and/or deactivation by Medium Access Control (MAC) control elements.

Based at least on the information provided by the eNB, the UE may prioritize inter-frequency D2D operation on certain carriers and/or PLMN(s), in case the UE capabilities are limited.

The second solution includes the UE signalling different UE CA capabilities depending on the scenario, e.g., whether the serving cell belong to the HPLMN or VPLMN. Depending on the scenario, the UE may avoid signalling UE CA capabilities that may be useful for performing D2D on a different carrier. This may for instance imply that the UE signals a restricted set of CA capabilities (or no CA capability at all) and by that free some transceiver resources for D2D on HPLMN carrier(s). Again similar events as described above may be used in the communication device, e.g. UE, for determination whether to signal full or limited CA capabilities to the NW node. For example, assume scenario of NSPS and camping on VPLMN, where the UE only send limited CA capabilities to NW node. A further example, considering the similar scenario, is that the communication device only may send limited CA capabilities if the communication device is in some "alert status" as described above.

An advantage of some of the embodiments is that they allow communication devices or UEs to perform D2D communication on different carriers than the serving one, at least in cases where D2D is given high priority, e.g., for public safety purpose.

FIG. 1 schematically illustrates a part of a cellular wireless communication system for providing an access network, and elements that may be involved in communication with a network node according to an embodiment. A base station 100, eNB, operates a cell 102, and a number of devices 104, 108, 110, 111, 112, 113 are assumed to operate within or close to the cell 102. A plurality of similar cells 114 are also provided in the wireless cellular communication system. A UE of the cellular wireless communication system may gain access and/or desired communication through different ways. For example: the UE 108 gains access through the base station 100 as also the UE 110, while D2D communication is performed between UE 110 and UE 111, as is between UE 111 and UE 112 and between UE 112 and 113. For example, the UEs 110, 111, 112, 113 may be NSPS UEs as discussed above, and carrier aggregation communication capabilities of UE 110 may be handled as demonstrated in any of the embodiments above. The base station 100 will thus act accordingly.

Figure 2:
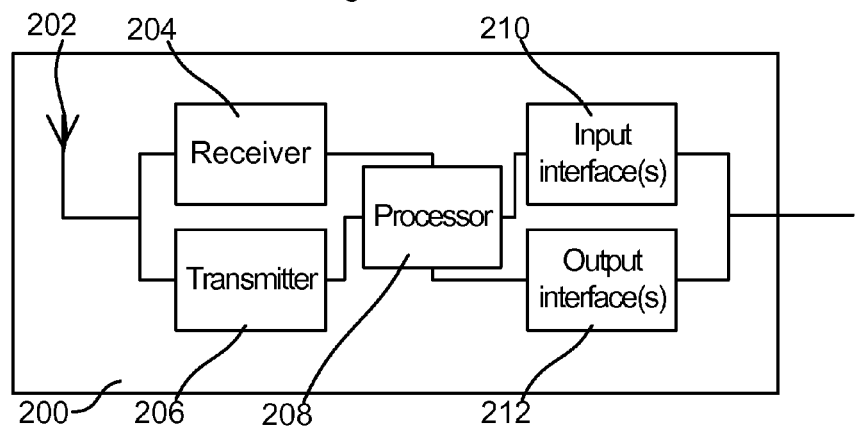
FIG. 2 is a block diagram schematically illustrating a network node according to an embodiment.

FIG. 2 is a block diagram schematically illustrating a network node, e.g. an eNB or other base station, 200 according to an embodiment. The network node comprises an antenna arrangement 202, a receiver 204 connected to the antenna arrangement 202, a transmitter 206 connected to the antenna arrangement 202, a processing element 208 which may comprise one or more circuits, one or more input interfaces 210 and one or more output interfaces 212. The interfaces 210, 212 signal interfaces, e.g. electrical or optical, for communicating with other parts of the communication network for signaling and payload, but may also include other interfaces. The network node 200 is arranged to operate in a cellular communication network. In particular, by the processing element 208 being arranged to perform the embodiments demonstrated above, the network node 200 is capable of receiving carrier aggregation communication capabilities signaling from a UE and provide configurations and signal them to UEs, as demonstrated above. The processing element 208 can also fulfill a multitude of tasks, ranging from signal processing to enable reception and transmission since it is connected to the receiver 204 and transmitter 206, executing applications and signalling, controlling the interfaces 210, 212, etc.

Figure 3:
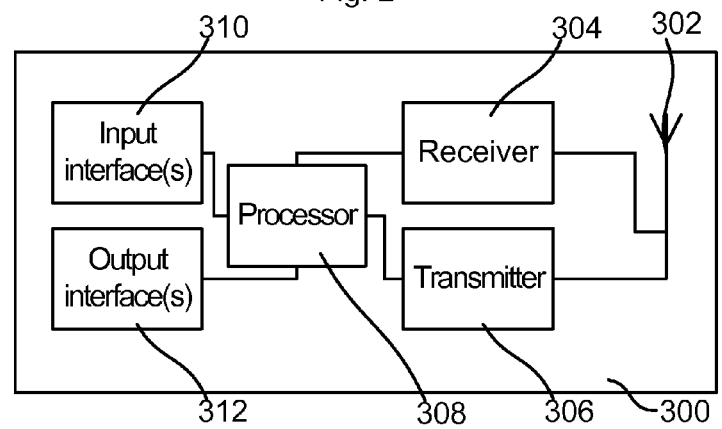
FIG. 3 is a block diagram schematically illustrating a communication device according to an embodiment.

FIG. 3 is a block diagram schematically illustrating a communication device, e.g. a UE, 300 according to an embodiment. The UE 300 comprises an antenna arrangement 302, a receiver 304 connected to the antenna arrangement 302, a transmitter 306 connected to the antenna arrangement 302, a processing element 308 which may comprise one or more circuits, one or more input interfaces 310 and one or more output interfaces 312. The interfaces 310, 312 can be user interfaces and/or signal interfaces, e.g. electrical or optical. The UE 300 is arranged to operate in a cellular communication network and is also capable of D2D communication. In particular, by the processing element 308 being arranged to perform the embodiments demonstrated above, the UE 300 is capable of determining its carrier aggregation communication capabilities, determine whether inter-frequency D2D communication is to be performed, and signal accordingly to a network node as discussed above. The processing element 308 can also fulfill a multitude of tasks, ranging from signal processing to enable reception and transmission since it is connected to the receiver 304 and transmitter 306, executing applications, controlling the interfaces 310, 312, etc.

Figure 4:
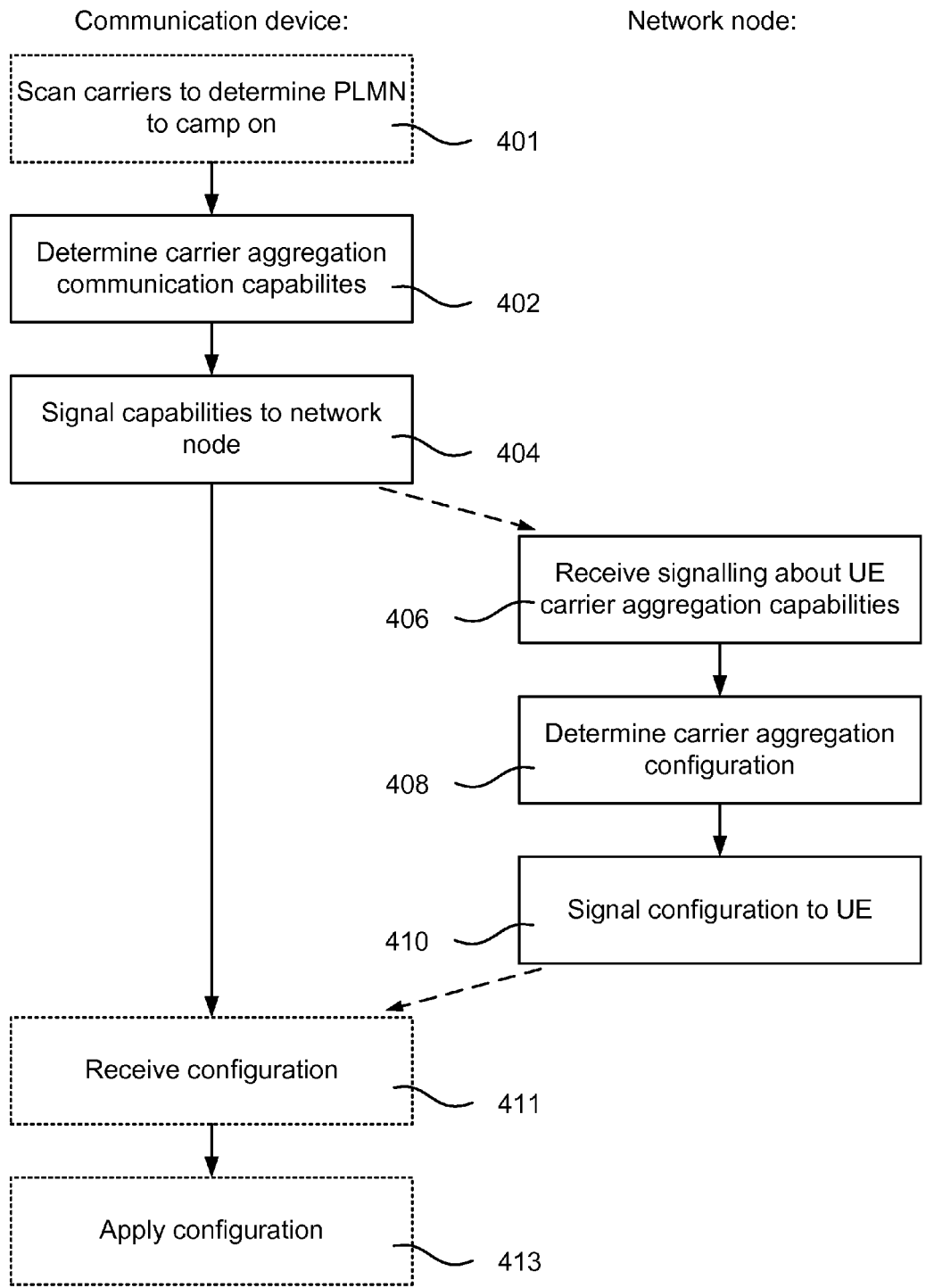
FIG. 4 is a flow chart illustrating a method according to an embodiment.

FIG. 4 is a flow chart illustrating a method of a communication system as demonstrated above. Further, the respective parts of the flow chart illustrate a method of the communication device and the network node, respectively. The method comprises, at UE side, determining 402 carrier aggregation communication capabilities suitable for D2D communication and carrier aggregation. The method may also comprise, for collecting data for the determination 402, scanning 401 of carriers for PLMN to camp on. Based on the determination, signalling 404 of the carrier aggregation communication capabilities to the network node is performed. Different approaches for the determination 402 and signalling 404 are, in addition to what is demonstrated above, demonstrated with reference to FIGS. 5 and 6. The method comprises, at the eNB side, receiving 406, from the communication device, signalling about carrier aggregation communication capabilities suitable for D2D communication and carrier aggregation of the communication device. Based thereon, possibly in addition to other network constraints, the eNB determines 408 a configuration for the communication device regarding D2D communication and/or carrier aggregation. The configuration is then transmitted 410 to the communication device. The UE may then receive 411 the configuration and apply 413 the configuration.

FIG. 5 is a flow chart schematically illustrating an approach for determining and signalling carrier aggregation communication capabilities by the communication device. The communication device determines 500 all its carrier aggregation capabilities, under the existing circumstances. The communication device further determines 502 whether D2D communication is intended to be performed, e.g. as demonstrated above for a public safety alert situation. Based on the determinations 500, 502, a signalling message is formed 504 comprising all the determined carrier aggregation communication capabilities and an indication whether D2D communication is intended.

FIG. 6 is a flow chart schematically illustrating another approach for determining and signalling carrier aggregation communication capabilities by the communication device. Similar to the approach demonstrated with reference to FIG. 5, the communication device determines 600 all its carrier aggregation capabilities, under the existing circumstances. The communication device further determines 602 whether D2D communication is intended to be performed, e.g. as demonstrated above for a public safety alert situation. However, in this approach, the communication device forms 604 a signalling message, based on the determinations 600, 602, comprising carrier aggregation communication capabilities which the communication device do not intend to occupy with D2D communication.

The methods according to the embodiments of the present invention are suitable for implementation with aid of processing means, such as computers and/or processors, especially for the case where the processing elements 208, 308, respectively, demonstrated above comprises a processor handling the methods demonstrated with reference to FIGS. 4 to 6, respectively. Therefore, there is provided computer programs, comprising instructions arranged to cause the processing means, processor, or computer to perform the steps of any of the methods according to any of the embodiments described with reference to FIGS. 4 to 6. The computer programs preferably comprises program code which is stored on a computer readable medium 700, as illustrated in FIG. 7, which can be loaded and executed by a processing means, processor, or computer 702 to cause it to perform the methods, respectively, according to embodiments of the present invention, preferably as any of the embodiments described with reference to FIGS. 4 to 6. The computer 702 and computer program product 700 can be arranged to execute the program code sequentially where actions of the any of the methods are performed stepwise. The processing means, processor, or computer 702 is preferably what normally is referred to as an embedded system. Thus, the depicted computer readable medium 700 and computer 702 in FIG. 7 should be construed to be for illustrative purposes only to provide understanding of the principle, and not to be construed as any direct illustration of the elements.

The invention claimed is:
1. A communication system comprising:
a cellular communication network; and
at least a communication device interacting with the cellular communication network;
the cellular communication network comprising:
at least a network node including node processing circuitry, the node processing circuitry configured to:
receive, from the communication device, signalling about a subset of carrier aggregation communication capabilities suitable for D2D and carrier aggregation communication of the communication device;
determine a configuration for the communication device regarding carrier aggregation based on at least the received signalling; and
transmit the configuration to the communication device; and
the communication device configured for D2D communication within a cellular communication system framework and for carrier aggregation for cellular communication, the communication device including device processing circuitry, the device processing circuitry being configured to:
determine carrier aggregation communication capabilities suitable for the D2D communication and the carrier aggregation;

signal the subset of the carrier aggregation communication capabilities to the network node;

implement D2D communication using at least one of the carrier aggregation capabilities other than the subset of the carrier aggregation communication capabilities; and implement carrier aggregation communication using the carrier aggregation communication capabilities of the subset of the carrier aggregation communication capabilities.

2. A communication device for device-to-device, D2D, communication within a cellular communication system framework and for carrier aggregation for cellular communication, the communication device including a processor and a non-transitory computer readable medium, the non-transitory computer readable medium containing instructions that when executed by the processor, cause the processor to:

determine carrier aggregation communication capabilities suitable for the D2D communication and the carrier aggregation;

signal a subset of the carrier aggregation communication capabilities to a network node of the cellular communication system;

implement D2D communication using at least one of the carrier aggregation communication capabilities other than the subset of the carrier aggregation communication capabilities; and implement carrier aggregation communication using the carrier aggregation capabilities of the subset of the carrier aggregation communication capabilities.

3. The communication device of claim 2, wherein the non-transitory computer readable medium contains further instruction that when executed by the processor, cause the processor to:

determine all the carrier aggregation communication capabilities; and determine whether D2D communication is intended; and signal carrier aggregation communication capabilities including information about all carrier aggregation communication capabilities and the intention to allocate some of the carrier aggregation communication capabilities for D2D communication on at least one carrier.

4. The communication device of claim 3, wherein the information about the intention to allocate some of the carrier aggregation communication capabilities for D2D communication comprises at least one of:

public land mobile network identity for D2D communication;

type of application;

frequency; and priority index.

5. The communication device of claim 3, wherein the intention to allocate some of the carrier aggregation communication capabilities for D2D communication is based on at least one of a communication scenario and a coverage state of the communication device.

6. The communication device of claim 5, wherein the intention to allocate some of the carrier aggregation communication capabilities for D2D communication is based on whether the communication device is one of camping on and served by one of a visitor public land mobile network and a home public land mobile network.

7. The communication device of claim 3, wherein the processing circuitry is further configured to receive signalling from the network node, which the network node knows carrier aggregation communication capabilities from the signalling of all of the communication device's carrier aggregation communication capabilities, about a configuration for allocating the carrier aggregation communication capabilities.

8. The communication device of claim 2, wherein the computer readable medium includes further instructions that when executed by the processor, cause the processor to determine the carrier aggregation communication capabilities by:

determining all capabilities and determining whether D2D communication is intended.

9. The communication device of claim 8, wherein the subset of carrier aggregation communication capabilities is determined based on at least one of signal propagation environment, a communication scenario and a coverage state of the communication device.

10. The communication device of claim 9, wherein the subset of carrier aggregation communication capabilities is determined based on whether the communication device is one of camping on and served by one of a visitor public land mobile network and a home public land mobile network.

11. A method of a communication system, the communication system having a cellular communication network and at least a communication device interacting with the cellular communication network, the cellular communication network having at least a network node, and the communication device being configured for device-to-device, D2D, communication within a cellular communication system framework and for carrier aggregation for cellular communication, the method comprising:

receiving, at the network node and from the communication device, signalling about a subset of carrier aggregation communication capabilities suitable for D2D communication and carrier aggregation of the communication device;

determining, at the network node, a configuration for the communication device regarding carrier aggregation based on at least the received signalling; and transmitting, at the network node, the configuration to the communication device;

determining, at the communication device, carrier aggregation communication capabilities suitable for D2D communication and carrier aggregation; and signalling, at the communication device, the subset of the carrier aggregation communication capabilities to the network node;

implementing, at the communication device, D2D communication using at least one of the carrier aggregation communication capabilities other than the subset of the carrier aggregation communication capabilities; and implementing, at the communication device, carrier aggregation communication using the carrier aggregation communication capabilities of the subset of the carrier aggregation communication capabilities.

12. A method of a communication device configured to support device-to-device, D2D, communication within a cellular communication system framework and configured to support carrier aggregation for cellular communication, the method comprising:

determining carrier aggregation communication capabilities suitable for D2D communication and carrier aggregation;

signalling a subset of the carrier aggregation communication capabilities to a network node of the cellular communication system;

implementing D2D communication capabilities using at least one of the carrier aggregation communication capabilities other than the subset of the carrier aggregation communication capabilities; and implementing carrier aggregation communication using the carrier aggregation communication capabilities of the subset of the carrier aggregation communication capabilities.

13. The method of claim 12, further comprising:
determining all the carrier aggregation communication capabilities; and
determining whether D2D communication is intended; and
signalling carrier aggregation communication capabilities including information about all the carrier aggregation communication capabilities and the intention to allocate some of the carrier aggregation communication capabilities for D2D communication on at least one carrier.

14. The method of claim 13, wherein the information about the intention to allocate some of the carrier aggregation communication capabilities for D2D communication comprises at least one of:
public land mobile network identity for D2D communication;
type of application;
frequency; and
priority index.

15. The method of claim 13, wherein the intention to allocate some of the carrier aggregation communication capabilities for D2D communication is based on at least one of a communication scenario and a coverage state of the communication device.

16. The method of claim 15, wherein the intention to allocate some of the carrier aggregation communication capabilities for D2D communication is based on whether the communication is one of camping on and served by one of a visitor public land mobile network and a home public land mobile network.

17. The method of claim 13, further comprising receiving signalling from the network node, which network node knows carrier aggregation communication capabilities from the signalling of all of the communication device's carrier aggregation communication capabilities, about a configuration for allocating the carrier aggregation communication capabilities.

18. The method of claim 12, wherein the determining of the carrier aggregation communication capabilities comprises:
determining all the carrier aggregation communication capabilities; and
determining whether D2D communication is intended.

19. The method of claim 18, wherein the subset of carrier aggregation communication capabilities is determined based on at least one of signal propagation environment, a communication scenario and a coverage state of the communication device.

20. The method of claim 19, wherein the subset of carrier aggregation communication capabilities is determined based on whether the communication device is one of camping on and served by one of a visitor public land mobile network and a home public land mobile network.

21. A non-transitory computer readable medium storing instructions which, when executed on a processor of a communication device configured to support device-to-device, D2D, communication within a cellular communication system framework and configured to support carrier aggregation for cellular communication, cause the processor to:
determine carrier aggregation communication capabilities suitable for D2D communication and carrier aggregation;
signal a subset of the carrier aggregation communication capabilities to a network node of the cellular communication system;
implement D2D communication using at least one of the carrier aggregation communication capabilities other than the subset of the carrier aggregation communication capabilities; and
implement carrier aggregation communication using the carrier aggregation communication capabilities of the subset of the carrier aggregation communication capabilities.

* * * * *

UNITED STATES PATENT AND TRADEMARK OFFICE
CERTIFICATE OF CORRECTION

PATENT NO. : 9,713,151 B2
APPLICATION NO. : 14/648732
DATED : July 18, 2017
INVENTOR(S) : Lindoff et al.

It is certified that error appears in the above-identified patent and that said Letters Patent is hereby corrected as shown below:

On the Title Page

In Item (56), under "OTHER PUBLICATIONS", in Column 2, Lines 2-3, delete "Computing, Networking and Communications (ICNC), 2014 International Conference on" and insert -- International Conference on Computing, Networking and Communications (ICNC), 2014, --, therefor.

In the Drawings

In Fig. 4, Sheet 2 of 3, for Step "402", in Line 2, delete "capabilites" and insert -- capabilities --, therefor.

In the Specification

In Column 5, Line 67, delete "VisitorPLMN," and insert -- Visitor PLMN, --, therefor.

In Column 6, Line 8, delete "may be be" and insert -- may be --, therefor.

In Column 7, Line 65, delete "carriers)." and insert -- carrier(s). --, therefor.

In Column 8, Line 37, delete "eNB," and insert -- e.g. eNB, --, therefor.

In the Claims

In Column 11, Line 67, in Claim 7, delete "which the" and insert -- which --, therefor.

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*